(12) United States Patent
Zander

(10) Patent No.: US 10,941,806 B2
(45) Date of Patent: Mar. 9, 2021

(54) WASHER FOR A FASTENING CLIP ASSEMBLY

(71) Applicant: Illinois Tool Works Inc., Glenview, IL (US)

(72) Inventor: Jason Mikeal Zander, Roberts, WI (US)

(73) Assignee: Illinois Tool Works Inc., Glenview, IL (US)

( * ) Notice: Subject to any disclaimer, the term of this patent is extended or adjusted under 35 U.S.C. 154(b) by 295 days.

(21) Appl. No.: 15/778,098

(22) PCT Filed: Oct. 11, 2016

(86) PCT No.: PCT/US2016/056380
§ 371 (c)(1),
(2) Date: May 22, 2018

(87) PCT Pub. No.: WO2017/095528
PCT Pub. Date: Jun. 8, 2017

(65) Prior Publication Data
US 2018/0347618 A1    Dec. 6, 2018

Related U.S. Application Data

(60) Provisional application No. 62/261,403, filed on Dec. 1, 2015.

(51) Int. Cl.
*F16B 43/00* (2006.01)
*F16B 21/08* (2006.01)
*F16B 5/06* (2006.01)

(52) U.S. Cl.
CPC .......... *F16B 43/001* (2013.01); *F16B 21/086* (2013.01); *F16B 5/0621* (2013.01)

(58) Field of Classification Search
CPC ............................ F16B 43/001; F16B 21/086
(Continued)

(56) References Cited

U.S. PATENT DOCUMENTS 3,149,850 A * 9/1964 Fischer ................. F16B 43/001
411/542
4,230,326 A * 10/1980 White ..................... B02C 17/22
16/2.2
(Continued)

FOREIGN PATENT DOCUMENTS

CN        102203437 A    9/2011
DE        19519623 A1    12/1996
(Continued)

OTHER PUBLICATIONS

International Search Report and Written Opinion for PCT/US2016/056380.
(Continued)

*Primary Examiner* — Flemming Saether
(74) *Attorney, Agent, or Firm* — Quarles & Brady LLP

(57) ABSTRACT

A washer is configured to be secured underneath a flange of a fastening clip assembly. The washer includes an annular support ring defining a central channel and having a first surface and a second surface that is opposite from the first surface. The first surface is configured to abut into and sealingly engage the flange at two or more locations. An inner sealing rim extends from the second surface proximate to the central channel. The inner sealing rim is configured to sealingly engage a component at a first component sealing interface. An outer sealing rim extends from the second surface and is outwardly separated from the inner sealing rim by a gap. The outer sealing rim is configured to sealingly engage the component at a second component sealing interface.

16 Claims, 2 Drawing Sheets

(58) Field of Classification Search
USPC .................................................. 411/542, 508
See application file for complete search history.

(56) References Cited

U.S. PATENT DOCUMENTS

| | | | | |
|---|---|---|---|---|
| 4,373,842 A * | 2/1983 | Bettini | .................. | F16B 33/004 |
| | | | | 411/377 |
| 4,878,316 A | 11/1989 | Mackay | | |
| 7,328,489 B2 | 2/2008 | Leverger | | |
| 8,545,155 B2 * | 10/2013 | Giraud | .................... | F16B 21/02 |
| | | | | 411/371.2 |
| 8,883,059 B2 * | 11/2014 | Lewis | ..................... | F16B 5/065 |
| | | | | 264/250 |
| 2006/0086765 A1 * | 4/2006 | Harberts | .................. | B60J 10/30 |
| | | | | 224/309 |
| 2017/0009798 A1 * | 1/2017 | Archer | .................. | F16B 37/044 |

FOREIGN PATENT DOCUMENTS

| | | |
|---|---|---|
| EP | 0200358 | 11/1986 |
| EP | 2894358 | 7/2015 |
| GB | 2360322 A | 9/2001 |
| JP | 2013148188 A | 8/2013 |
| WO | 2004/067973 A1 | 8/2004 |

OTHER PUBLICATIONS

Second Office Action from corresponding Chinese Patent Application No. 201680069982.7, dated Apr. 29, 2020 (22 pages) (with English translation).

* cited by examiner

WASHER FOR A FASTENING CLIP ASSEMBLY

RELATED APPLICATIONS

This application is a National Phase of International Application No. PCT/US2016/056380, filed Oct. 11, 2016, which relates to and claims priority benefits from U.S. Provisional Patent Application No. 62/261,403 entitled "Washer for a Fastening Clip Assembly," filed Dec. 1, 2015, which is hereby incorporated by reference in its entirety.

FIELD OF EMBODIMENTS OF THE DISCLOSURE

Embodiments of the present disclosure generally relate to a fastening clip assembly having a washer.

BACKGROUND

Various assemblies include panels or objects connected to one another. Automobile assemblies, for example, include various panels and structures connected to other panels or structures, or to the automobile frame itself. In particular, snap-fit assemblies may be used to connect the pieces together. Additionally, a fastener may be preassembled with one of the components or panels, while the second component or panel is connected to the preassembly during final assembly. A plurality of the fasteners may be used when connecting relatively large components together. Such fasteners have been provided in a variety of shapes and configurations suitable for the particular components to be connected.

Certain fasteners connect to one or more components with a sealing washer therebetween. The sealing washer provides a seal that protects against moisture infiltration, for example.

A known fastening clip includes a seal that is overmolded around a flange. However, tooling limitations typically restrict how close a sealing surface can be positioned to a sheet metal hole. In particular, the diameter of the seal may be formed having a minimum distance. A tool used to form the seal has a steel protuberance that forms the inner diameter of the top surface of the seal. The protuberance is restricted in diameter by the diameter of the head and/or body of the fastening clip. As such, sealing material is typically not able to be formed within a cylindrical envelope defined by the head of the fastening clip. Further, the seal provides a single seal contact around the hole formed through one of the components.

SUMMARY OF EMBODIMENTS OF THE DISCLOSURE

A need exists for a fastening clip assembly that provides a robust seal interface with a component. A need exists for a fastening clip assembly that provides a sealing interface proximate to a hole of a component into which the fastening clip assembly secures.

With those needs in mind, certain embodiments of the present disclosure provide a washer that configured to be secured underneath a flange of a fastening clip assembly. The washer includes an annular support ring defining a central channel and having a first surface and a second surface that is opposite from the first surface. The first surface is configured to abut into and sealingly engage the flange at two or more locations. An inner sealing rim extends from the second surface proximate to the central channel. The inner sealing rim is configured to sealingly engage a component at a first component sealing interface. An outer sealing rim extends from the second surface and is outwardly separated from the inner sealing rim by a gap. The outer sealing rim is configured to sealingly engage the component at a second component sealing interface. In at least one embodiment, the washer is formed of an elastomeric material that is configured to dampen vibrations and prevent moisture infiltration.

The annular support ring may include an inner diameter wall connected to an outer diameter wall through an intermediate spanning wall. In at least one embodiment, the spanning wall includes a plurality of ribs and spars that define a plurality of recessed channels to form a honeycomb structural pattern. The inner diameter wall may define the central channel.

In at least one embodiment, the inner sealing rim outwardly flares away from a central longitudinal axis of the washer from an inner diameter wall towards a first sealing lip. Similarly, the outer sealing rim outwardly flares away from the central longitudinal axis proximate to an outer diameter wall towards a second sealing lip.

At least a portion of the annular support ring is configured to be compressively retained by the flange.

The inner sealing rim is configured to be within an axial envelope of a head of the fastening clip assembly. In at least one embodiment, at least a portion of the outer sealing rim is configured to be within an axial envelope of the fastening clip assembly.

Certain embodiments of the present disclosure provide a fastening clip assembly that is configured to securely fasten to a component. The fastening clip assembly includes a head connected to an annular flange through a reduced diameter neck, and a washer secured underneath the flange.

Certain embodiments of the present disclosure provide a securing system that includes a component, and a fastening clip assembly securely fastened to the component. The fastening clip assembly includes a head connected to an annular flange through a reduced diameter neck, and a washer secured underneath the flange.

Figure 1:
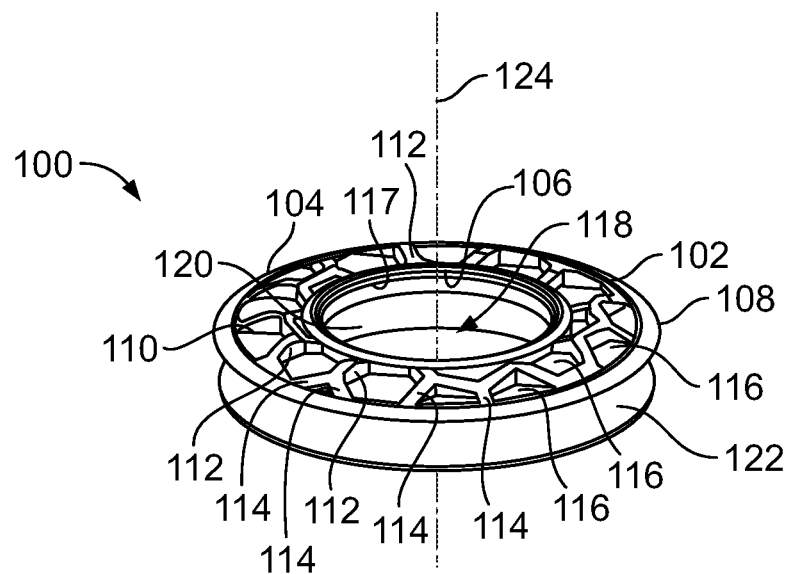
FIG. 1 illustrates a top perspective view of a washer, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a washer that is configured for use with a fastening clip assembly. The fastening clip assembly may include a head connected to an annular flange through a neck. In at least one embodiment, a central beam extends from the flange opposite from the head. Opposed, deflectable securing wings connect to the central beam, such as proximate to a lead-in nose.

The washer may be formed of an elastomeric material, such as santoprene, rubber, or the like. The washer is configured to secure to a flange or umbrella of the fastening clip assembly. The washer may include a honeycomb upper surface that provides strength and rigidity, while also reducing material and weight. As such, the washer is robust and relatively light.

In at least one embodiment, the washer is secured underneath the flange, and has multiple clip sealing interfaces (such as points, ridges, or other such contact regions) that abut into an underside of the flange. Additionally, the washer includes sealing rims that provide multiple component sealing interfaces (such as points, rings, or such contact regions) with respect to a component, such as a panel, to which the fastening clip assembly secures. The component sealing contacts are closer to the hole formed in the panel as compared to seals of known fastening clips. In contrast to known seals, the component sealing contacts may be underneath the head of the fastening clip assembly. Accordingly, the washer is stable, provides improved sealing, and resists axial tilt and misalignment. Further, unlike foam seals, the washer may be formed of an elastomeric material and is better able to protect against water seepage. Additionally, the washer resists corrosion (unlike foam seals, which may become saturated). Embodiments of the present disclosure provide a washer having multiple sealing contacts with respect to both the fastening clip assembly and the component.

The washer may be secured to the fastening clip assembly through a mechanical connection underneath the flange. The inner diameter of the washer may be smaller than the outer profile of the flange or umbrella (as opposed to a seal that is overmolded to an outer edge of the flange).

For example, the washer may be a secondary molded structure. As such, the sealing surfaces may be positioned closer to a hole in a component as compared to known seals.

The washer provides multiple sealing locations around the hole of the component. Therefore, the washer provides robust and reliable sealing.

The washer provides a seal that protects against moisture infiltration, while also dampening vibrations, thereby reducing the potential for undesired noise. The washer combines the sealing benefits of an overmolded seal and the simplicity of a foam seal that may be quickly and easily connected to a fastening clip assembly.

FIG. 1 illustrates a top perspective view of a washer 100, according to an embodiment of the present disclosure. The washer 100 includes a main, unitary body 102, which may be formed of an elastomeric material, such as rubber. The elastomeric material provides an effective seal and also effectively dampens vibrations (which could otherwise generate undesired noise, such as rattling).

The main body 102 includes an annular support ring 104 having an inner diameter wall 106 connected to an outer diameter wall 108 through an intermediate spanning wall 110. The spanning wall 110 includes a plurality of radial ribs 112 and support spars 114 that define recessed channels 116 therebetween. The ribs, spars 114, and channels 116 cooperate to provide a honeycomb structural pattern that provides a strong, robust construction that is also relatively light due to the decreased amount of material used to form the support ring 104. Alternatively, the main body 102 may not include a honeycomb construction. In at least one embodiment, the main body 102 may include a structural pattern having various different shapes, including trapezoids, rectangles, diamonds, arcuate shapes, and/or the like. In at least one other embodiment, the main body 102 may include a fully-contiguous rim of material that is devoid of channels, ribs, and spars.

An interior surface 117 of the inner diameter wall 106 defines a central channel 118. The central channel 118 is configured to receive a central beam and securing wings of a fastening clip assembly.

A flexible, resilient, deflectable inner sealing rim 120 downwardly extends from the support ring 104 proximate to the central channel 118. A flexible, resilient, deflectable outer sealing rim 122 downwardly extends from the support ring 102 proximate to the outer diameter wall 108. The inner sealing rim 120 is separated from the outer sealing rim 122 by a circumferential gap 126 (shown in FIG. 2). Each of the sealing rim 120 and the outer sealing rim 122 may be a contiguous, circumferential rim that circumferentially extends around a central longitudinal axis 124 of the washer 100. That is, each of the inner sealing rim 120 and the outer sealing rim 122 may extend a full 360 degrees around the longitudinal axis 124.

Figure 2:
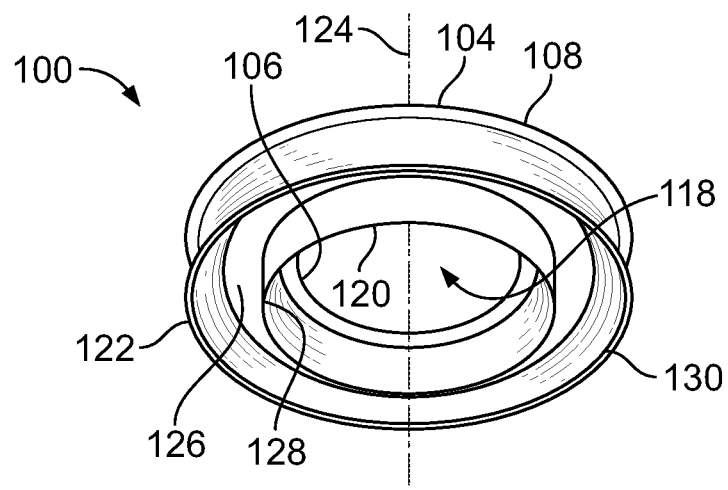
FIG. 2 illustrates a bottom perspective view of a washer, according to an embodiment of the present disclosure.

FIG. 2 illustrates a bottom perspective view of the washer 100. As shown, the circumferential gap 126 separates the inner sealing rim 120 from the outer sealing rim 122. The inner sealing rim 120 outwardly flares away from the central longitudinal axis 124 from the inner diameter wall 106 of support ring 104 towards a sealing lip 128. Similarly, the outer sealing rim 120 outwardly flares away from the central longitudinal axis 124 from the support ring 104 proximate to the outer diameter wall 108 towards a sealing lip 130.

As shown, the washer 100 includes two sealing rims 120 and 122. Optionally, the washer 100 may include additional sealing rims. For example, a third sealing rim may downwardly extend from the support ring 104 between the sealing rims 120 and 122. Moreover, one or more sealing rims may extend upwardly from the support ring 104.

Figure 3:
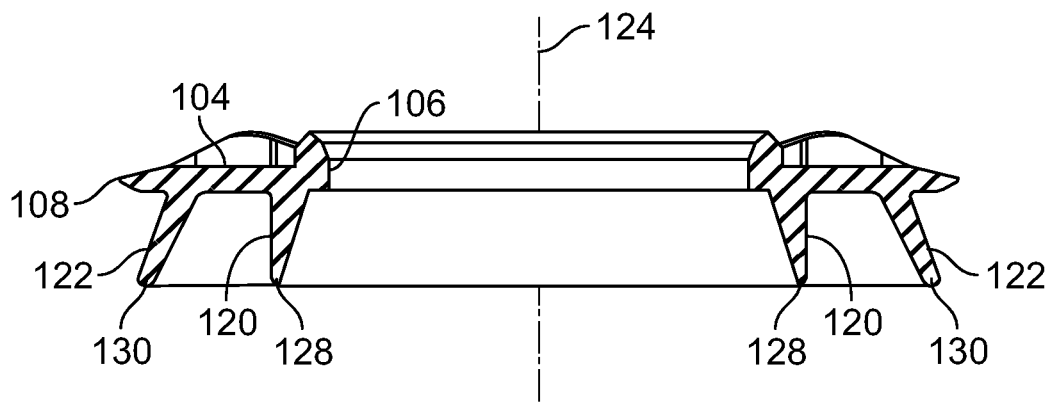
FIG. 3 illustrates a transverse cross-sectional view of a washer, according to an embodiment of the present disclosure.

FIG. 3 illustrates a transverse cross-sectional view of the washer 100. As shown in FIG. 3, the inner sealing rim 120 and the outer sealing rim 122 outwardly flare away from the longitudinal axis 124 from the support ring 104 towards the respective sealing lips 128 and 130.

Figure 4:
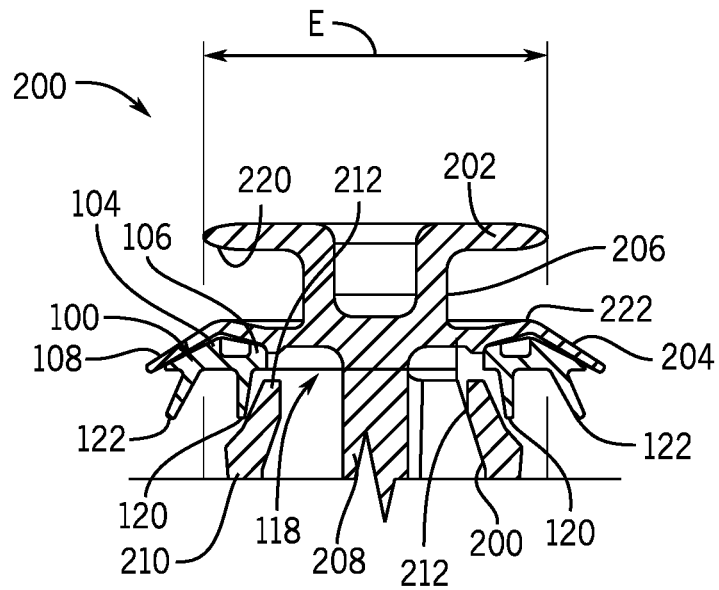
FIG. 4 illustrates a transverse cross-sectional view of a fastening clip assembly including a washer, according to an embodiment of the present disclosure.

FIG. 4 illustrates a transverse cross-sectional view of a fastening clip assembly 200 including the washer 100, according to an embodiment of the present disclosure. The fastening clip assembly 200 includes a head 202 connected to an annular flange 204 through a reduced diameter neck 206. A central beam 208 extends from the flange 204 opposite from the head 202. Opposed, deflectable securing wings 210 connect to opposite sides of the beam 208, such as proximate to a lead-in nose (not shown in FIG. 4). As shown, the central beam 208 is positioned through the central channel 118 of the washer 100. Further, upper tips 212 of the wings 210 may be positioned between interior surfaces of the inner sealing rim 120.

In operation, the fastening clip assembly 200 is used to secure two components together. At least one of the components may be a panel, for example. The lead-in nose (not shown in FIG. 4) of the fastening clip assembly 200 is urged into a hole of the component. With continued urging into the hole of the component, the securing wings 210 inwardly deflect as they slide over an interior surface of the component that defines the hole. As the fastening clip assembly continues to be urged into the hole, the securing wings 210 flex back, such that the inwardly-canted tips 212 expand back towards at-rest positions (and having a span therebetween that is greater than the diameter of the hole of the component), thereby securely fastening the fastening clip assembly 200 to the component. In this position, the sealing rims 120 and 122 sealingly engage an upper surface of the component, while the support ring sealingly engages a lower surface of the flange 204. As such, the washer 100 prevents moisture from infiltrating between the flange 204 and the component.

Another component (such as an additional panel, cap, stud, or the like) may secure to the fastening clip assembly 200, such as between the head 202 and an upper surface of the flange 204. For example, the second component may include a hole formed through a structure. The hole is configured to be positioned around the neck 206, while an edge portion of the component that defines the hole is sandwiched between a lower surface 220 of the head 202 and an upper surface 222 of the flange 204.

Optionally, the washer 100 may be used with various other fastening clip assemblies. For example, the washer 100 may be used with fastening clip assemblies that include various other securing structures, such as arcuate connecting arms, legs, or the like. As another example, instead of a central post and wings, a mirror image head and neck may extend below the flange 204. The washer 100 may be used with other fastening clip assemblies similar to those shown and described in U.S. Pat. No. 6,305,055, entitled "Fastener Provided with a Snapping-in Foot to be Pushed in Through a Hole in a Panel," U.S. Pat. No. 6,796,006, entitled "Rib Clip," U.S. Pat. No. 6,974,292, entitled "One-Piece Reusable Plastic Fastener," U.S. Pat. No. 7,328,489, entitled "Fastener for Fixing a Panel to a Support and Provided with a head Comprising a Deformable Member," U.S. Pat. No. 8,613,128, entitled "Push-In Fastener Assembly," and U.S. Patent Application Publication No. 2006/0099051, entitled "Sealing Fastener."

Figure 5:
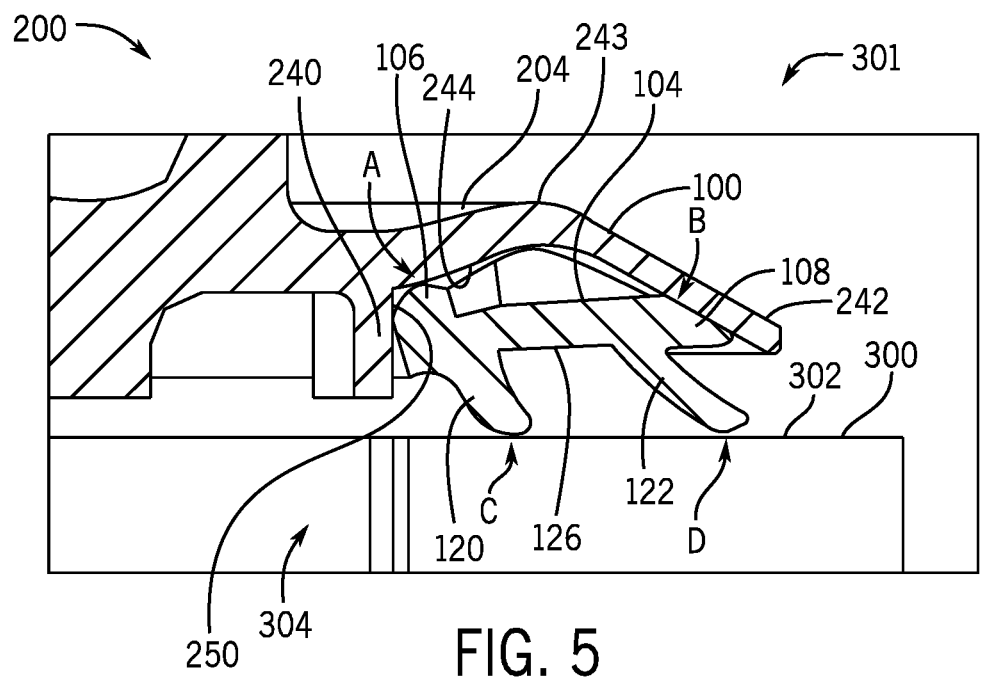
FIG. 5 illustrates a perspective, partial cross-sectional view of a washer positioned between a flange of a fastening clip assembly and a component, according to an embodiment of the present disclosure.

FIG. 5 illustrates a perspective, partial cross-sectional view of the washer 100 positioned between the flange 204 of the fastening clip assembly 200 and a component 300, according to an embodiment of the present disclosure. The fastening clip assembly 200 securely fixed to the component 300 provides a securing system 301. As shown, the flange 204 may include a downwardly-extending wall 240 (such as a circumferential wall) that is inboard from an outer edge 242. The flange 204 may include an upwardly-extending crest 243 between the wall 240 and the edge 242.

The inner diameter wall 106 of the washer 100 abuts into an underside 244 of the flange 204 proximate to the wall 240, while at least a portion of the interior surface 117 of the inner diameter wall 106 abuts into an outer lateral surface 250 of the wall 240. The outer diameter wall 108 abuts into the underside 244 of the flange 204 proximate to the outer edge 242. In this manner, the support ring 104 is compressively retained by the flange 204, such as by being compressively sandwiched between the wall 240 and the edge 242 of the flange 204.

The washer 100 provides two sealing interfaces with the underside of the flange 204. In particular, the inner diameter wall 106 sealingly engages the flange 204 proximate to the wall 240 at interface A, while the outer diameter wall 108 sealingly engages the flange 204 proximate to the outer edge 242 at interface B. Additional sealing interfaces between the washer 100 and the flange 204 may be used. For example, an upper surfaces of the support ring 104 may conform to an underside surface of the flange 204.

The component 300 may be a panel having an upper surface 302 surrounding a hole 304. The inner sealing rim 120 sealingly abuts into the upper surface 302 proximate to the hole 304 at sealing interface C, while the outer sealing rim 122 sealingly abuts into the upper surface 302 further away from the hole 304 at sealing interface D (as the outer sealing rim 122 is outwardly offset from the inner sealing rim 120 by the gap 126). As such, the washer provides two sealing interfaces with the upper surface 302 of the component 300.

The inner sealing rim 120 and the outer sealing rim 122 are flexible and resilient. Thus, when the washer 100 is compressed between the flange 204 and the component 300, the sealing rims 122 tend to radially flatten, which increases the surfaces areas of the sealing interfaces C and D between the sealing rims 120, 122 and the upper surface 302 of the component 300.

Referring to FIGS. 1-5, the washer 100 sealingly engages the flange 204 at two separate and distinct clip sealing interfaces A and B, and sealingly engages the component 300 at two separate and distinct component sealing interfaces C and D. The sealing interfaces A, B, C, and D provide sealing regions that prevent, minimize, or otherwise reduce a possibility of moisture from infiltrating past the sealing interfaces A, B, C, and D.

As shown in FIG. 4, in particular, the inner sealing rim 120 may be directly underneath the head 202 of the fastening clip assembly 200. The inner sealing rim 120 is within an axial envelope E of the head 202, in contrast to prior clip seals. Further, at least a portion of the outer sealing rim 122 may be underneath the head 202, and within an envelope of the head 202. As such, the washer 100 provides improved sealing and resists axial tilt and misalignment. Further, unlike foam seals, the washer 100 may be formed of an elastomeric material and is well suited to protect against water seepage. Additionally, the washer 100 resists corrosion (unlike foam seals, which may become saturated).

The washer 100 secures to the fastening clip assembly 200 through a mechanical connection underneath the flange 204. As shown in FIG. 5, in particular, the support ring 104 is compressed between portions of the underside of the flange 204, thereby securely and efficiently securing the washer 100 to the flange 204. Further, unlike prior seals that fit over a circumferential edge of a flange, the inner diameter of the washer 100 is smaller than the outer profile of the flange 204, thereby providing a more compact assembly.

In at least one embodiment, the washer 100 is a secondary molded structure. As such, the sealing interfaces A, B, C, and D may be positioned closer to the hole 304 of the component 300 as compared to seals that are overmolded onto an outer edge of a flange.

The washer 100 provides multiple sealing interfaces (such as the sealing interfaces C and D) around the hole 304 of the component 300. As such, the washer 100 provides robust, stable, and reliable sealing with respect to the component 300.

The washer 100 provides a seal that protects against moisture infiltration, while also dampening vibrations, thereby reducing the potential for undesired noise. The washer 100 combines the sealing benefits of an overmolded seal and the simplicity of a foam seal that may be quickly and easily connected to a fastening clip assembly.

It has been found that the washer 100 provides improved sealing capabilities with respect to the fastening clip assembly 200 and the component 300, as compared to known seals that are overmolded around an outer edge of a flange. In particular, the multiple sealing interfaces A, B, C, and D maintain sealing engagement with the flange 204 and the component 300 while subjected to axial and lateral forces that are two to three times more than known overmolded seals are able to withstand.

As described above, embodiments of the present disclosure provide a fastening clip assembly that provides a robust seal interface with a component. Embodiments of the present disclosure provide a fastening clip assembly that provides a sealing interface proximate to a hole of a component to which the fastening clip assembly secures.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A washer configured to be secured underneath a flange of a fastening clip assembly, the washer comprising:
    an annular support ring defining a central channel and having a first surface and a second surface that is opposite from the first surface, wherein the first surface is configured to abut into and sealingly engage the flange at two or more locations;
    an inner sealing rim extending from the second surface proximate to the central channel, wherein the inner sealing rim is configured to sealingly engage a component at a first component sealing interface; and
    an outer sealing rim extending from the second surface and outwardly separated from the inner sealing rim by a gap, wherein the outer sealing rim is configured to sealingly engage the component at a second component sealing interface,
    wherein the annular support ring includes an inner diameter wall connected to an outer diameter wall through an intermediate spanning wall, and
    wherein the spanning wall includes a plurality of ribs and spars that define a plurality of recessed channels to form a honeycomb structural pattern.

2. The washer of claim 1, wherein the washer is formed of an elastomeric material that is configured to dampen vibrations and prevent moisture infiltration.

3. The washer of claim 1, wherein the inner diameter wall defines the central channel.

4. The washer of claim 1, wherein the inner sealing rim outwardly flares away from a central longitudinal axis of the washer from an inner diameter wall towards a first sealing lip, and wherein the outer sealing rim outwardly flares away from the central longitudinal axis proximate to an outer diameter wall towards a second sealing lip.

5. The washer of claim 1, wherein at least a portion of the annular support ring is configured to be compressively retained by the flange.

6. The washer of claim 1, wherein the inner sealing rim is configured to be within an axial envelope of a head of the fastening clip assembly.

7. The washer of claim 6, wherein at least a portion of the outer sealing rim is configured to be within an axial envelope of the fastening clip assembly.

8. A fastening clip assembly that is configured to securely fasten to a component, the fastening clip assembly comprising:
    a head connected to an annular flange through a reduced diameter neck; and
    a washer secured underneath the flange, the washer comprising:
    an annular support ring defining a central channel and having a first surface and a second surface that is opposite from the first surface, wherein the first surface abuts into and sealingly engages an underside of the flange at two or more locations;
    an inner sealing rim extending from the second surface proximate to the central channel, wherein the inner sealing rim is configured to sealingly engage a component at a first component sealing interface; and
    an outer sealing rim extending from the second surface and outwardly separated from the inner sealing rim by a gap, wherein the outer sealing rim is configured to sealingly engage the component at a second component sealing interface,
    wherein the annular support ring includes an inner diameter wall connected to an outer diameter wall through an intermediate spanning wall, and
    wherein the spanning wall includes a plurality of ribs and spars that define a plurality of recessed channels to form a honeycomb structural pattern.

9. The fastening clip assembly of claim 8, wherein the washer is formed of an elastomeric material that is configured to dampen vibrations and prevent moisture infiltration.

10. The fastening clip assembly of claim 8, wherein the inner diameter wall defines the central channel.

11. The fastening clip assembly of claim 8, wherein the inner sealing rim outwardly flares away from a central longitudinal axis of the washer from an inner diameter wall towards a first sealing lip, and wherein the outer sealing rim outwardly flares away from the central longitudinal axis proximate to an outer diameter wall towards a second sealing lip.

12. The fastening clip assembly of claim 8, wherein at least a portion of the annular support ring is compressively retained by the flange.

13. The fastening clip assembly of claim 8, wherein the inner sealing rim is within an axial envelope of the head of the fastening clip assembly.

14. The fastening clip assembly of claim 13, wherein at least a portion of the outer sealing rim is within an axial envelope of the fastening clip assembly.

15. A securing system comprising:
   a component; and
   a fastening clip assembly securely fastened to the component, the fastening clip assembly comprising:
   a head connected to an annular flange through a reduced diameter neck; and
   a washer secured underneath the flange, wherein the washer is formed of an elastomeric material that is configured to dampen vibrations and prevent moisture infiltration, the washer comprising:
      (a) an annular support ring including an inner diameter wall defining a central channel connected to an outer diameter wall through an intermediate spanning wall, wherein the spanning wall includes a plurality of ribs and spars that define a plurality of recessed channels to form a honeycomb structural pattern, wherein the annular support ring has a first surface and a second surface that is opposite from the first surface, wherein the first surface abuts into and sealingly engages an underside of the flange at two or more locations, wherein at least a portion of the annular support ring is compressively retained by the flange;
      (b) an inner sealing rim extending from the second surface proximate to the central channel, wherein the inner sealing rim sealingly engages the component at a first component sealing interface, wherein the inner sealing rim outwardly flares away from a central longitudinal axis of the washer from the inner diameter wall towards a first sealing lip, wherein the inner sealing rim is within an axial envelope of the head of the fastening clip assembly; and
      (c) an outer sealing rim extending from the second surface and outwardly separated from the inner sealing rim by a gap, wherein the outer sealing rim is sealingly engages the component at a second component sealing interface, and wherein the outer sealing rim outwardly flares away from the central longitudinal axis proximate to the outer diameter wall towards a second sealing lip.

16. The securing system of claim 15, wherein at least a portion of the outer sealing rim is within an axial envelope of the fastening clip assembly.

* * * * *